June 5, 1928.

J. W. OLTMAN 1,672,036

HEAT EXCHANGE CYLINDER

Filed Jan. 17, 1925

John W. Oltman, Inventor

By his Attorney

Chas. W. Mortimer

Patented June 5, 1928.

1,672,036

UNITED STATES PATENT OFFICE.

JOHN W. OLTMAN, OF CHICAGO, ILLINOIS, ASSIGNOR TO THE BARRETT COMPANY, A CORPORATION OF NEW JERSEY.

HEAT-EXCHANGE CYLINDER.

Application filed January 17, 1925. Serial No. 2,981.

This invention relates to a cooling or heating drum. It relates more particularly to a drum for drying materials such as a sheet of felt roofing, for example. Heretofore in devices of this sort it has been necessary when high temperatures were desired to introduce a heating fluid such as steam, for example, at high pressure in order to obtain the desired temperature. In such cases troubles have arisen because of the difficulty of providing steam-tight joints where the inlet pipes were connected to revolving parts.

By the present invention the portion of the device for containing the hot fluids under pressure is kept stationary thus obviating the difficulties that occur because of leakage between stationary and moving parts, and the portion that revolves is placed in proximity to the heated stationary part with a heat conducting liquid such as oil, asphalt, pitch or the like therebetween. Mercury has been found to be the most desirable liquid for this purpose on account of its high heat conductivity, high boiling point, low freezing point, and resistance to change at elevated temperatures.

Figure 1:
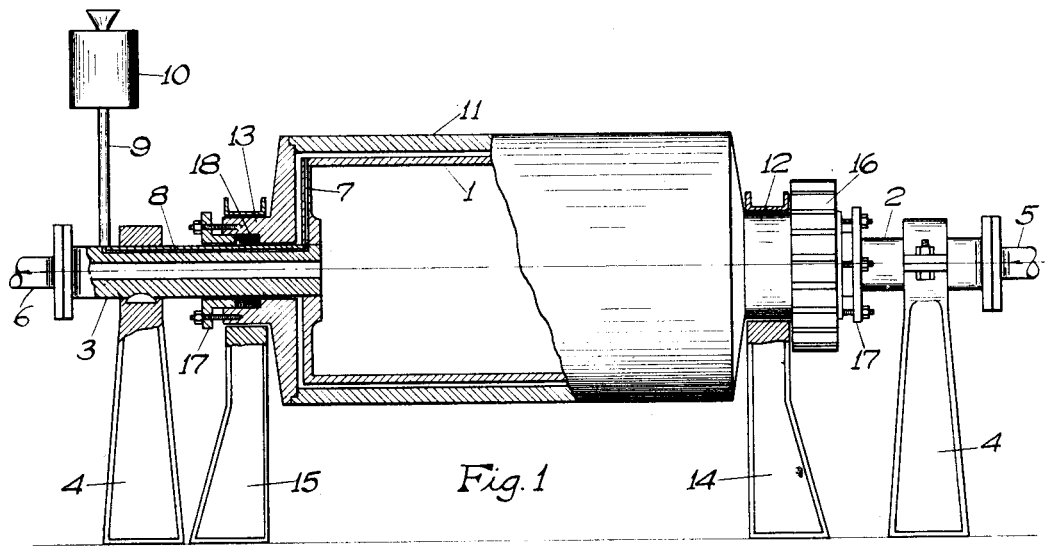
Figure 2:
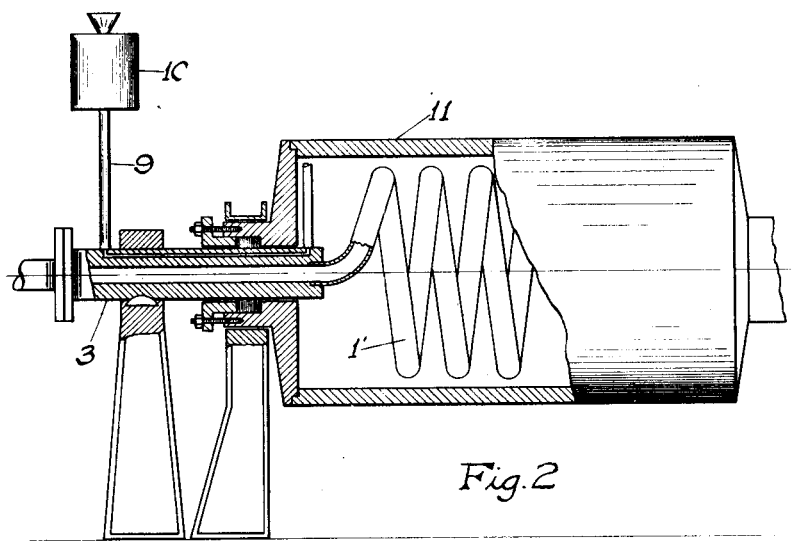

The invention will be understood from the description in connection with the accompanying drawings in which Fig. 1 is a side view of the device partly in section; and Fig. 2 is a similar view partly broken away showing a modification.

In the drawings reference character 1 indicates a hollow stationary cylinder which has two hollow extensions 2 and 3 that serve to keep the cylinder 1 in place. These extensions are rigidly mounted in supports 4 and inlet pipe 5 and outlet pipe 6 are connected to the extensions 2 and 3. A channel 7 in the end wall of the cylinder 1 leads from the cylindrical surface of the cylinder 1 to the longitudinal channel 8 in extension 3 which, in turn, is connected to a pipe 9 leading to an overflow tank 10.

The outer revoluble cylinder 11 is provided with bearings 12 and 13 which are journaled in the supports 14 and 15. The cylinder 11 is provided with a driving gear 16 for revolving the same or it may be revolved in any other convenient manner. Glands or stuffing boxes 17 retain the packing material 18 between the extensions 2 and 3 and the portion of the cylinder 11 therearound thus preventing leakage along the outside of the extensions 2 and 3.

In the modification illustrated in Fig. 2 the parts are all the same except that the spiral pipe 1' is used in lieu of the hollow cylinder 1. It is obvious that the extensions 2 and 3 may terminate in headers with one or more circular series of pipes joining the headers inside of the cylinder 11. The space between the cylinder 1 (or the pipe 1') and the cylinder 11 is filled with the appropriate liquid.

The operation is as follows: A heating fluid such as steam under high pressure, for example, is introduced through the pipe 5 into the inside of the stationary cylinder 1 and after heating the same this material passes out through the extension 3 and pipe 6. The cylinder 11 is set in motion and the heat is transmitted to this cylinder through the liquid (preferably mercury) located between the two cylinders. If the entire space between the two cylinders is filled with the liquid, the liquid will stand at a certain height in the pipe 9 and in case the same is expanded by heating, the excess liquid will be driven through the channels 7 and 8 and pipe 9 into the tank 10. The material such as a sheet of felt roofing, for example, that is to be dried is brought into contact with the outside surface of the cylinder 11 and becomes dried as it passes thereover. In case the material to be dried or heated comes into contact only with the lower side of the cylinder 11, the liquid between the two cylinders 1 and 11 does not have to fill the entire space between the two, but can merely remain in the lower portion below the stuffing boxes 17 or packing rings 18 thus eliminating all tendency to leak. Even with the heat transferring liquid filling the entire space between the cylinders, no pressure to cause leakage will be at the gland 17 except a slight pressure due to the small static head. The stationary parts through which the highly heated or high pressure fluid is introduced can readily be made of requisite strength to stand the operating conditions.

In case it is desired to use the drum for cooling instead of heating purposes, a cooling fluid in lieu of a heating fluid is passed through the pipe 5.

I claim:

1. In a device of the character described, a revoluble cylinder, a cylindrical shaped stationary heater inside and in close proximity to said cylinder, means for introducing a hot fluid into said heater and a liquid interposed between said cylinder and heater.

2. In a device of the character described, a revoluble cylinder, a cylindrical shaped stationary heater inside and in close proximity to said cylinder, a liquid interposed between said cylinder and heater and means to permit said liquid to expand and contract while so interposed.

3. In a device of the character described, a revoluble cylinder, a stationary heater inside said cylinder, supports for said heater and a vent through one of said supports communicating with the space between said cylinder and heater, said vent communicating with an overflow chamber for heat transmitting fluid which may be introduced into the space between said heater and cylinder.

4. In a device of the character described, a revoluble cylinder, a stationary cylinder of slightly smaller external diameter than the internal diameter of said revoluble cylinder within said revoluble cylinder and having hollow extensions therefrom mounted in supports, said first named cylinder being revolubly mounted upon said extensions, and means within one of said extensions for introducing a heating fluid into said stationary cylinder and a heat transmitting fluid into the space between said cylinders.

5. In a device of the character described, a revoluble cylinder, a cylindrical shaped stationary element inside and in close proximity to said cylinder, and means for introducing a fluid into said element and means for housing a fluid in the space between said cylinder and element.

In testimony whereof I affix my signature.

JOHN W. OLTMAN.